United States Patent
Wolf

[15] 3,651,739
[45] Mar. 28, 1972

[54] MACHINE TOOL

[72] Inventor: Heinz K. Wolf, Willoughby Hills, Ohio

[73] Assignee: The New Britain Machine Company, New Britain, Conn.

[22] Filed: Jan. 30, 1970

[21] Appl. No.: 7,194

[52] U.S. Cl. ........................................... 90/11 D, 408/239 A
[51] Int. Cl. ........................................................ B23c 1/00
[58] Field of Search ........................... 90/11 A, 11 D; 60/54.5; 408/238, 239 R, 239 A, 240

[56] References Cited

UNITED STATES PATENTS

| | | | |
|---|---|---|---|
| 3,023,675 | 3/1962 | Stephan | 90/11 A |
| 3,071,930 | 1/1963 | Moulin | 60/54.5 |

*Primary Examiner*—Gerald A. Dost
*Attorney*—David S. Urey, Alan C. Rose and Alfred B. Levine

[57] ABSTRACT

A machine tool including a movable spindlehead member having a rotatable tool spindle member reciprocable lengthwise parallel with its axis of rotation, and a work-supporting compound slide assembly having two slide members movable in directions at right angles to one another. All members can be selectively moved at feed and traverse rates in opposite directions by variable speed motors, one connectable to the spindlehead or the tool spindle and the other to either of the two slide members of the work-supporting compound slide. The motors are connected to their respective tool and work-moving members through discrete transmissions of the continuously meshed gear type under the control of hydraulically actuated clutches. Spindle feed is alternatively provided from a spindle drive motor to correlate feed with rotation. The tool spindle is provided with spring-biased mechanism for engaging a tool arbor having a tapered shank and retaining the same in a suitable tapered tool arbor socket provided in the front or tool end of the spindle and fluid pressure actuated compound motor means for releasing the tool arbor from the spindle arbor socket.

4 Claims, 4 Drawing Figures

INVENTOR.
HEINZ K. WOLF

3,651,739

MACHINE TOOL

FIELD OF THE INVENTION

This invention relates to a machine tool having a rotatable tool spindle and especially to the mechanism for connecting and disconnecting a tool or a tool-carrying arbor to and from the spindle.

PRIOR ART

Prior to the present invention it was customary to provide machine tools such as horizontal boring, milling and drilling machines with spring-biased means for securing a tool arbor having a tapered shank in a tapered aperture in the front or tool end of the rotatable, extensible and retractable tool spindle and fluid pressure-actuated means for releasing the tool arbor from the spindle socket. The problem, however, has been that of providing sufficiently powerful apparatus within the space available using shop or tool from fluid pressure sources to release the tool arbor considering the fact that it is tightly wedged in the spindle socket.

SUMMARY OF INVENTION

The present invention provides a machine tool and more particularly a horizontal boring, milling and drilling machine comprising a rotatable, extensible and retractable tool spindle having a tapered tool arbor receiving socket in its front or tool end, spring-biased means for pulling and securing a tool arbor in the spindle socket, and fluid pressure-actuated means including compound reciprocating motor means operable from conventional shop or toolroom fluid pressure sources for releasing the tool arbor from the spindle socket which will be reliable in operation regardless of how tightly the tapered shank of the tool arbor is wedged in the tapered spindle socket.

DETAILED DESCRIPTION OF PREFERRED EMBODIMENT

The preferred embodiment of the invention is a horizontal boring, drilling and milling machine A having a horizontal bed portion B and a vertical column C extending upward from or at one side of the bed. A spindlehead member D is guided by the column C for vertical movement in a straight path and carries a spindle member E for supporting a tool. The spindle is rotatable about its longitudinal axis to rotate the tool, and is movable for extension and retraction in a straight path along its axis of rotation, normal to the path of movement of the head member. A compound slide F is supported on the bed B for carrying the work being machined by the tool. The compound slide includes a bottom slide member G, hereinafter characterized as a saddle, movable in a horizontal straight path on the bed, transverse to the vertical column and spindle axis, and a top slide member H, hereinafter characterized as a table, movable in a horizontal straight path on the saddle, transverse to the saddle movement and parallel to the spindle axis.

Figure 1:
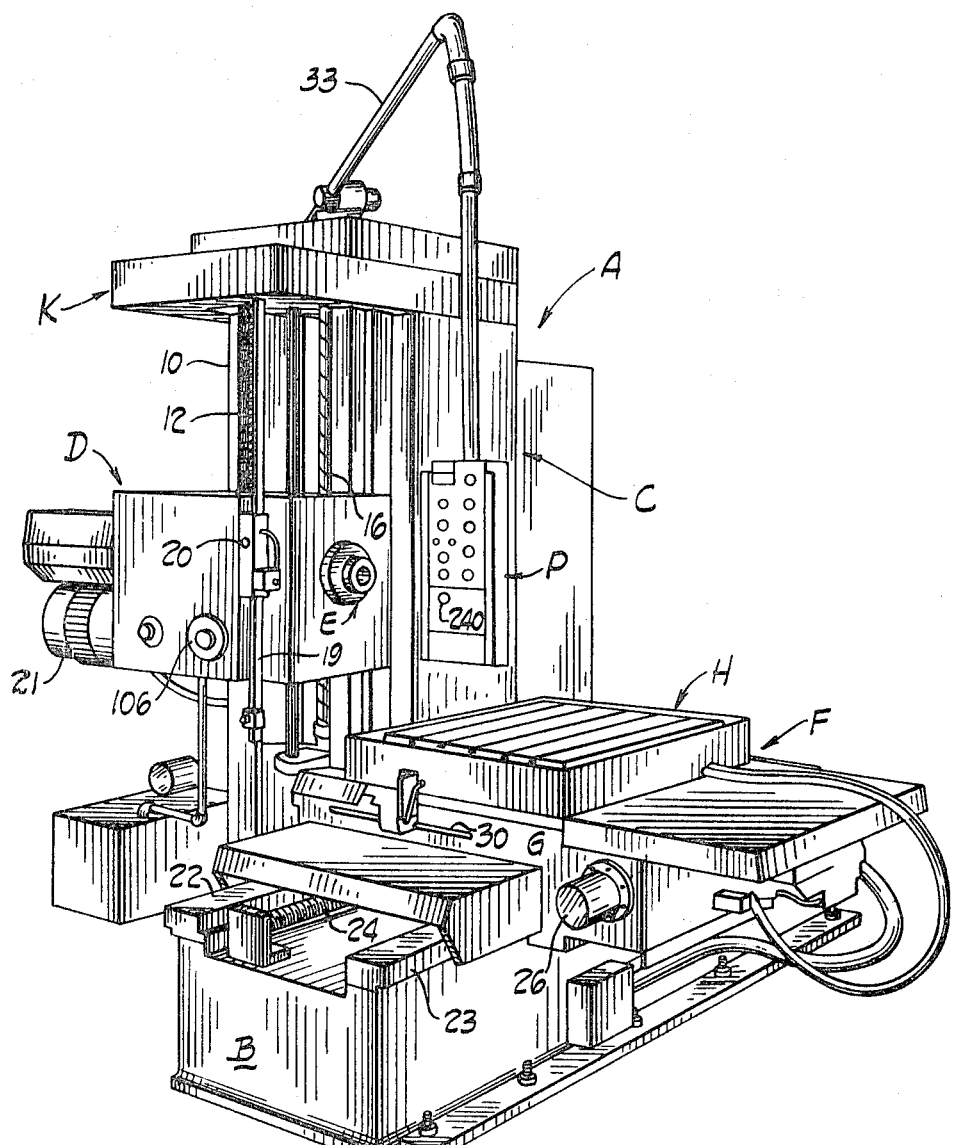
FIG. 1 is a perspective view of a horizontal boring, milling and drilling machine embodying the present invention.
Figure 2:
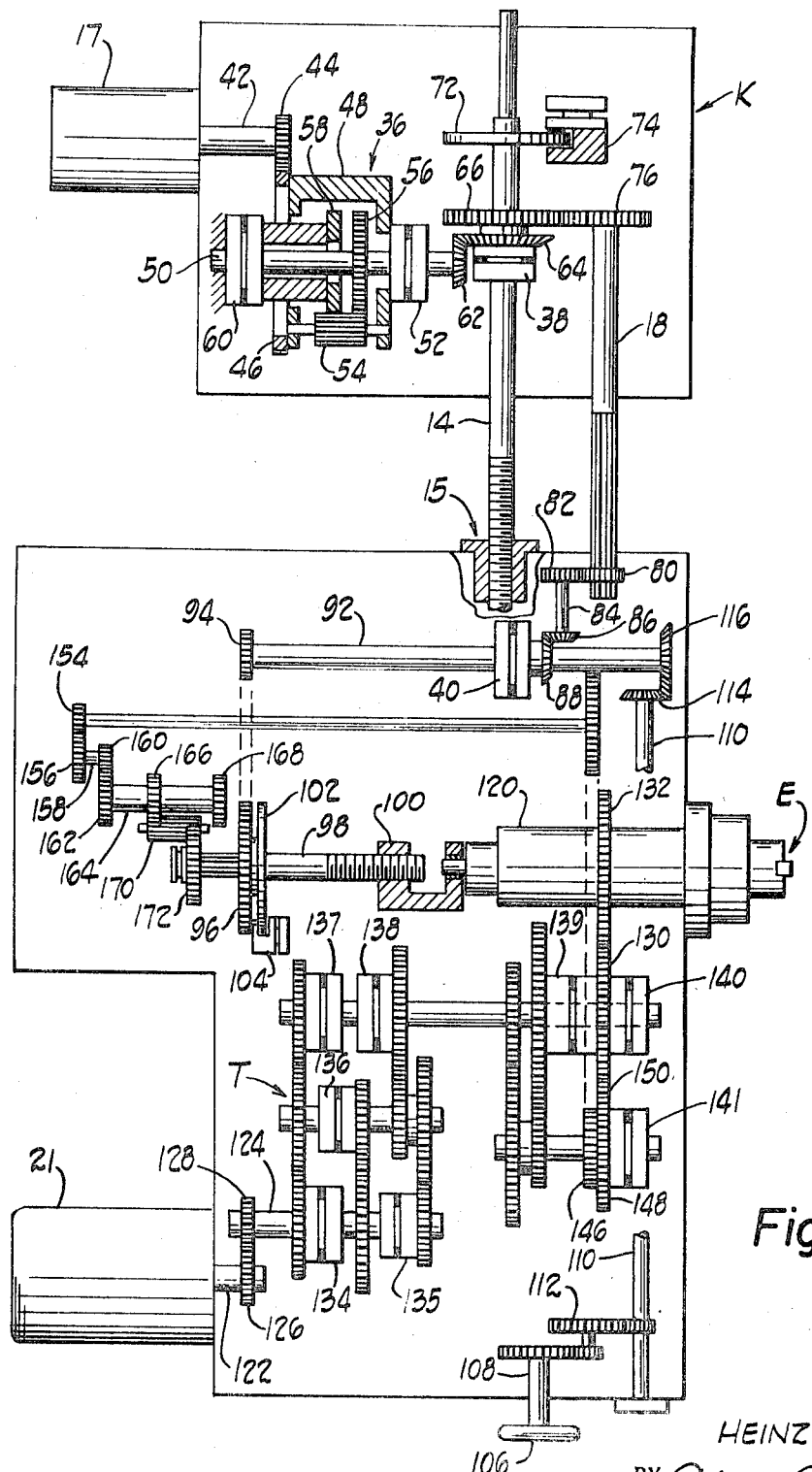
FIG. 2 is a diagrammatic view, principally in elevation, showing the transmission of the machine tool of FIG. 1, for moving the spindlehead member relative to the column, for extending and retracting the spindle carried by the head member and for rotating the spindle.

The head member D moves along vertical guideways 10, 11 on the column, is counterweighted by a counterweight in the column C connected to the head member by a chain 12, and is vertically positioned by a vertical head screw 14 threaded through a nut 15, see FIG. 2, fixed in the head member D. The screw 14 is rotatably supported but fixed against axial movement at its upper end in a crown member K on the top of the column C and at its lower end in a suitable bearing on the lower part of the column. As shown, the head screw 14 is enclosed by a vertically extensible sleeve 16 for protection. A variable-speed, reversible electric drive motor 17, see FIG. 2, located at the top of the column C provides power for rotating the head screw 14 to raise and lower the head member and a splined shaft 18 for extending and retracting the spindle member E relative to the head member. The splined shaft 18 is rotatably supported in the crown member K and extends downwardly through the spindlehead member D. A vertical gauge bar 19 extends from a cantilevered part of the crown member or housing K on the vertical column and cooperates with dial indicator 20, etc., to indicate the vertical position of the head member relative to a reference point on the machine. A spindle drive motor 21 is carried by the head member D for driving the spindle in rotation.

The saddle G is movable along horizontal ways 22, 23 on the bed B by means including a saddle screw 24 fixed to the bed and a rotary nut carried by the saddle and driven by a variable-speed drive motor 26 carried by the saddle. Horizontal table ways on the top side of the saddle extend transversely of the saddle ways on the bed, and support the table H for movement transversely of the direction of movement of the saddle. The table is moved by a table screw rotatably carried by the saddle which screw has threaded engagement in a nut fixed to the underside of the table. The table screw is driven by the slide drive motor 26. A gauge bar 30 is associated with the table and a similar gauge bar is associated with the saddle. The gauge bars each support means to indicate the position of the slides relative to reference points on the machine. A pendant control panel or station P is suspended in cantilevered fashion from a supporting conduit 33 in a convenient location adjacent the head member, saddle and table and carries the manual controls necessary for operating the machine.

The feed motor 17 is connected to one side of the housing or crown member K and is selectively connectable to the spindlehead member D and the spindle by a so-called continuous mesh drive including a two-speed planetary transmission indicated generally by reference number 36 and clutches 38, 40. The output or drive shaft 42 of the motor 17 has a gear 44 keyed thereto continuously in mesh with a ring gear 46 fixed to a planet gear carrier or support 48 of the planetary speed change transmission, The carrier 48 is rotatably supported by a rotatable shaft 50 in the crown member K. The carrier or planet gear support 48 is selectively coupled to or uncoupled from the shaft 50 by an electrically controlled hydraulically actuated clutch 52. A wide-faced planet gear 54 rotatably carried by the planet gear support 48 meshes with two sun gears 56, 58. The sun gear 56 is fixed to the shaft 50 while the sun gear 58 is freely rotatable on the shaft but can be selectively connected by an electrically controlled hydraulically actuated clutch 60 to the housing K so as to prevent rotation thereof. The sun gear 56 has a slightly greater number of teeth than the sun gear 58.

A bevel gear 62 is fixed to the end of the shaft 50 and drives a bevel gear 64 having a spur gear 66 fixed to the hub thereof. Both gears are rotatable in the housing or crown K about the upper nonthreaded part of the head screw 14. The construction is such that the gear 62 can be rotated at a relatively high speed by the motor 17 when the clutch 52 is actuated to connect the gear support 48 to the shaft 50 and the clutch 60 is disengaged so that the sun gear 58 idles freely about the shaft 50. Movement of the planet gear 54 about the sun gear 56 merely drives the sun gear 58 idly. The bevel gear 62 is driven at a relatively slow speed when the clutch 52 is deenergized to disconnect the gear support 48 from the shaft 50 and the clutch 60 is energized to hold the sun gear 58 stationary. In such condition, orbiting of the planet gear 54 about the fixed sun gear 58 drives the sun gear 56 at a very slow speed due to the differential in the number of teeth between the two sun gears, and thereby drives the shaft 50 at the slow speed.

The bevel gear 64 and its associated spur gear 66 which are rotatable about the upper part of the head screw 14 can be selectively coupled to the screw 14 by the electrically controlled fluid-actuated clutch 38. A brake disc 72 fixed to the screw 14 above the gear cluster can be clamped in fixed position against a stationary brake pad by a brake actuator assembly 74 fixed to the housing K to secure screw 14 against rotation and in turn to secure the head member D in a fixed position relative to the column C.

The gear 66 is continuously in mesh with a gear 76 fixed to the upper end of the spline shaft 18 and drives the spline shaft at all times that the gear 62 is driven. The lower end of the shaft 18 has a gear 80 splined thereon which gear is rotatably supported in the spindlehead member D and is continuously in mesh with a gear 82 fixed to a stud shaft 84 also rotatably supported in the spindlehead member. The shaft 84 has a bevel gear 86 keyed thereto which is continuously in mesh with a bevel gear 88 fixed to the drive member of the electrically controlled hydraulically actuated clutch 40. The driven member of the clutch 40 is rotatably supported on a shaft 92 rotatably supported in the spindlehead member and the driven member of the clutch is keyed to the shaft 92 so that the shaft can be rotated upon rotation of the gear 88 by engagement of the clutch 40. The shaft 92 has a gear 94 keyed thereto which gear is continuously in mesh with a gear 96 keyed or fixed on a spindle feed screw 98 rotatably supported in the spindlehead and having threaded engagement with a nut 100 in a feed slide assembly N slidably and nonrotatably carried in the spindlehead and rotatably connected to the rear part of the spindle E but fixed against axial movement relative to the spindle. A brake disc 102 fixed to the gear 96 can be clamped in fixed position against a stationary brake pad by a brake actuator assembly 104 fixed to the spindlehead to secure the spindle feed screw 98 against rotation and in turn the spindle E against axial movement in the spindlehead member D.

Provision is made for manually moving or positioning the spindle E axially in the form of a hand wheel 106 at the front of the spindlehead member and fixed to a shaft 108 rotatably supported in the spindlehead member. The shaft 108 is continuously connected to a shaft 110 by reduction gears, designated generally as 112. The shaft 110 is in turn connected by bevel gears 114, 116 to the shaft 92.

The spindle E is slidably keyed within a quill or sleeve member 120 rotatably supported in the spindlehead member D and adapted to be driven from the spindle drive motor 21 by a speed change transmission T. The output shaft 122 of the motor 21 is connected to the input shaft 124 of the transmission T by continuously meshed gears 126, 128 keyed thereto and to the shaft 124, respectively. The output or drive member of the speed change transmission is a gear 130 continuously in mesh with a gear 132 fixed on the quill 120.

The particular construction of the transmission T forms no part of the present invention and is not herein described in detail. Suffice it to say that it is of the constant mesh gear type in which the desired output speeds are obtained by selectively connecting and disconnecting suitable gears of the transmission to respective shafts upon which they are rotatably supported by electrically controlled fluid-operated clutches 134 to 141.

The spindle E can be selectively fed or moved axially as a function of or in predetermined relation to its rotation by a gear drive including a gear 144 continuously in mesh with a gear 146 of a gear cluster 148 in the transmission T. A second gear 150 of the gear cluster 148 is continuously in mesh with the output gear 130 of the transmission T. The gear 144 is fixed to a shaft 152 rotatably supported in the spindlehead member which shaft has a gear 154 fixed thereto and which is in continuous mesh with a gear 156 keyed to a shaft 158 also rotatably supported in the spindlehead member. The shaft 158 has a gear 160 fixed thereto and continuously in mesh with a gear 162 fixed to a shaft 164 having gears 166, 168 keyed thereto. The gear 166 is continuously in mesh with a wide-faced gear 170 rotatably supported in the spindlehead member D and adapted to be selectively engaged by a gear 172 slidably keyed to the spindle feed screw 98. The gear 172 is adapted to be shifted by electrically controlled solenoids between a neutral position in which it is free to rotate with the spindle feed screw 98 or into engagement with the gear 170 to rotate the spindle feed screw 98 in one direction or engagement with the gear 168 to rotate the spindle feed screw in the opposite direction. It will be understood that when the spindle screw 98 is driven from the motor 17, the gear 172 will be in its neutral or disengaged position and when the spindle feed screw 98 is driven from the spindle E the clutch 40 will be disengaged.

The construction and operation of the compound slide F forms no part of the present invention and is not herein shown and described in detail. Suffice it to say that the slide members thereof are moved in their respective paths of movement by the variable speed reversible motor 26, as previously mentioned.

The motors 17 and 26 may be of any type but are preferably variable speed silicon-controlled rectifier drives utilizing DC motors driven from an alternating current power source.

The movements of the various machine tool elements such as the spindlehead D, the spindle E, the saddle G and the table H, as well as the spindle rotation, etc, are controlled from the pendant station P which comprises the manually operable switches, etc. required for the operation of the machine.

The construction and operation of the machine tool A thus far described is the same as that shown in my copending application, Ser. No. 882,502, filed Dec. 5, 1969, entitled Machine Tool to which reference is made for a more complete and detailed description of the machine.

Figure 3:
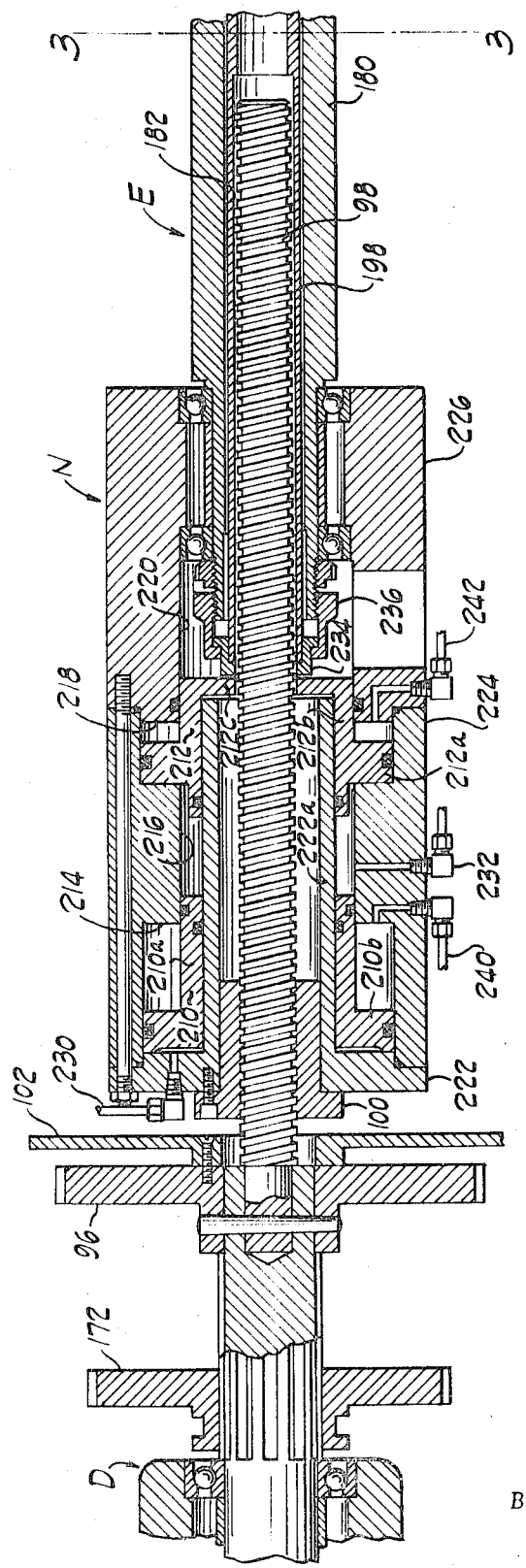
FIG. 3 is a fragmentary, sectional view, with portions in elevation, through the rear or non-tool portion of the tool spindle member of the machine tool of FIG. 1.
Figure 4:
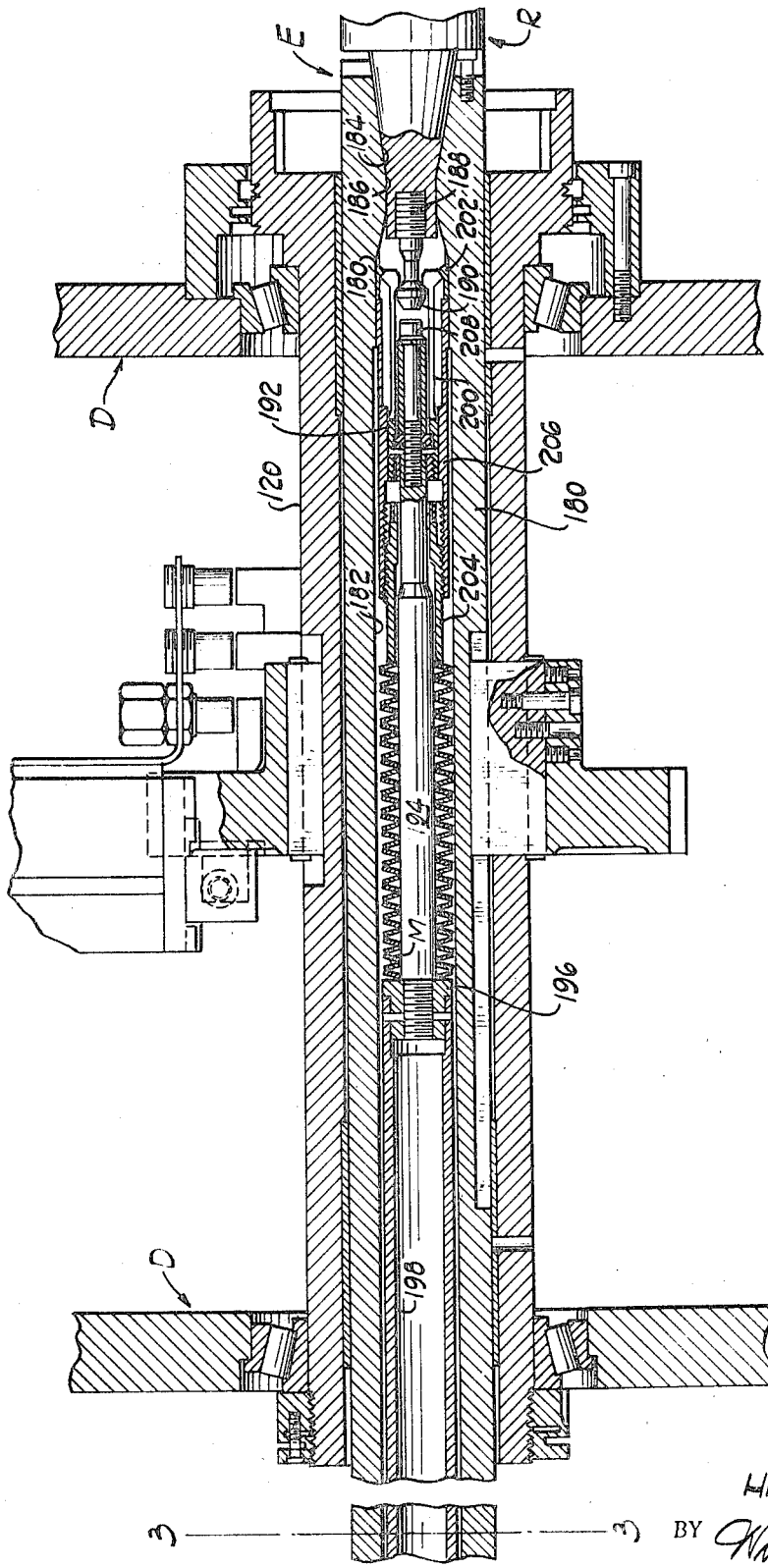
FIG. 4 is a fragmentary, sectional view similar to FIG. 3 but showing the front or tool portion of the tool spindle member and when joined to FIG. 3 along the dash-dot lines 3—3 produces a view showing essentially the entire spindle member.

The spindle E, see particularly FIGS. 3 and 4, comprises a tubular member 180 provided with an axially extending aperture 182, the forward portion of which aperture preferably forms a socket 184 having a slight taper to receive a tool or arbor R, for example the arbor of a conventional milling machine tool. The socket 184 terminates in a cylindrical bore 186 adapted to receive a cylindrical portion or pilot of the tool arbor. The tool arbor is provided with an adapter or lock plug 188 threaded onto a tapped hole in the rear end of the arbor, prior to its assembly in the spindle, until a flange formed thereon abuts against the rearward end of the arbor. Alternatively, the so-called adapter could be formed integrally with the arbor. The rear or left end of the adapter 188 is provided with a head 190 connected to the threaded portion of the adapter by a reduced portion or neck. The portion of the head adjacent to the neck is frustoconical in configuration and provides a conical surface diverging rearwardly with respect to the axis of the spindle, which surface is adapted to be engaged by mechanism for binding or locking the arbor in the spindle socket. The other or rear part of the head is also frustoconical in shape, but faces in the opposite direction.

The mechanism shown for locking or binding the arbor R in socket 184 comprises a collet 192 positioned within the bore 182 and connected to the forward end of a drawbar 194 in the bore 182, the rear end of which is connected by a cylindrical member 196 to the front end of a tubular drawbar 198 extending to the rear of the spindle. The collet 192 includes a plurality of spring or resilient fingers 200 each having a projecting wedge-shaped portion provided with an inner inclined surface and an outer inclined surface. The inner surface of each wedge portion is inclined with respect to the spindle axis so as to diverge rearwardly from the axis of the spindle and is adapted to engage the rearwardly diverging surface on the adapter 188 when the collet 192 is in its binding or locking position. The outer inclined surface of each finger also diverges rearwardly and engages an annular rearwardly diverging abutment surface on a flange extending inwardly from the inner wall of a bushing 202 fixed within the bore 182 of the spindle. The abutment surface on the bushing 202 diverges rearwardly with respect to the axis of the spindle with its acute angle of inclination less than the acute angle of inclination of the rearwardly diverging front or right conical surface of the adapter. The inner surfaces of the wedge ends of the collet fingers may be inclined, for example, at an angle of 30° to the axis of the spindle and the outer surfaces thereof at approximately 20. The angles of inclination of the front or right surface on the head part 190 of the adapter and the flange of the bushing 202 correspond with those of the engaging inside and outside surfaces of the wedge portions of the collet fingers, respectively. In the binding position of the collet the wedge-shaped portion of each of the fingers 200 acts as a wedge, preferably a locking wedge, operating between the fixed abutment surface on the bushing 202 carried by the spindle and the right inclined surface of the head 190 of the adapter 188.

The collet 192 is continuously urged to a retracted or wedging position to lock the arbor R in the spindle socket by a spring means M in the form of a plurality of oppositely facing heavy concavo-convex disc-like spring members in the bore 182 and interposed between the right or front side of the member 196 and the left end of a tubular member 204 within the bore 182 and adjustably threaded into a second tubular member 206, the right or front end of which abuts the left-hand side of the bushing 202. As can be appreciated, the spring means which holds the collet 192 in locking position must be extremely strong because the vibration, etc. produced during the cutting operation tends to loosen the tool arbor from the spindle socket. The disc-type spring M is particularly applicable because it requires a very limited movement for operation and can be so constructed to produce the desired amount of force without necessitating any change in its overall spindle dimensions.

To release the arbor R from the spindle socket 184, the collet 192 is moved forwardly in the bore 182 to move the wedge portions of the collet fingers to a position forwardly of the shoulder forming the forward or right-hand side of the internal flange of the bushing 202. With the wedge portions of the fingers forward of this shoulder, the collet fingers will expand and permit the withdrawal of the arbor from the spindle socket 184. As the collet 192 is moved forwardly an abutment member 208 threaded in a tapered aperture in the right end of the draw bar member 194 and the forward portion which projects into the collet functions as an ejector or abutment member and strikes the rear or left-hand end of the adapter 188 to unseat the arbor R from the socket 184. The movement of the ejector 208, after it engages the end of the adapter 188, need only be sufficient to break the arbor away from its seat in the socket 184. Preferably the inherent resiliency of the collet fingers 200 urge them into engagement with the head 190 of the adapter so that the arbor will be held by the fingers after it is unseated from the socket 184. To completely remove the arbor from the spindle socket the operator need merely pull it outwardly to cause the fingers to expand and release the arbor.

The collet 192 is moved forwardly with respect to the spindle member 202 from its rearward locking or binding position in bore 182 to its forward releasing-and-ejecting position by the fluid pressure-actuated reciprocating-type compound motor N having a pair of pistons designated generally as 210, 212, slidable in suitable cylinder-like stepped cylinder apertures 214, 216 and 218, 220 in the three parts 222, 224, 226 of the feed slide 226. The member 224 is of tubular shape and is counterbored from each end to a substantially larger diameter to form the right and external walls of the cylinder apertures 214, 218. The left wall of the aperture 214 is formed by the member 222 fixed to the left end of the member 224 and having a cylindrical tubular portion 222a extending towards the right and of less outside diameter than the minimum inside diameter of the member 224. The piston 210 which reciprocates on the tubular portion 222a has a tubular cylindrical portion 210a projecting to the right from the head portion 210b into the space between the exterior of the cylindrical tubular portion 222a of the member 222 and the minimum diameter of the member 224. The head portion 210b of the piston 210 has an external diameter which slidably fits within the interior wall of the cylinder aperture 214. Suitable O-ring seals are provided between the piston 210 and the wall of the counterbore which forms the cylinder aperture 214, between the piston 210 and the minimum diameter portion of the member 224, and between the piston 210 and the exterior of the tubular cylindrical portion 222a of the member 222. Pressure fluid, preferably oil, for moving the piston 210 toward the right, as viewed in FIG. 3, is supplied through a conduit 230 connected by a suitable fitting to the member 222 at a location to the left of the piston 210.

The piston 212 is generally similar in construction to the piston 210 and has a head portion 212a which fits within the cylinder aperture 218 and a cylindrical tubular portion 212b which surrounds the cylindrical tubular part 222a of the member 222 and projects into a counterbore in the left end of the member 226 of the feed slide. The space between the right end of the piston 210 and the left end of the piston 212 and between the exterior of the cylindrical tubular part 222a of the member 222 upon which the pistons slide and the interior of the member 224 forms the cylinder aperture 216 common to both motors and is maintained full of hydraulic fluid by an oil supply conduit 232 having a check valve therein for preventing reverse flow of oil. Pressure is created in the cylinder aperture 216 for moving the piston 212 toward the right by movement of the piston 210 toward the right. The left side of the piston head part 210b of the piston 210 is of considerably larger area than the right end face of the tubular cylindrical part 210a of the piston 210 and because of the differential between these areas a high pressure can be created on the left side of the piston head part 212a of the piston 212 which is of relatively large area by the application of pressure fluid of relatively low pressure to the left side of the piston 210.

The right end of the piston 212 has an internal flange 212c, the right side of which is adapted to engage the left end of a member 234 fixed to the left end of the tubular member 198. The forward or right end of the member 234 has an external flange which is received within the interior diameter of a sleeve member 236 having an internal flange at its left end which limits movement of the member 234 and in turn the member 198 to the left. The member 236 is adjustably threaded onto the left end of the cylinder member 180. The member 234 rotates with the spindle member 180 whereas the piston 212 and its inwardly projecting flange 212c, which is adapted to abut the left end of the member 234, is stationary. The cylinder apertures 214 and 218 to the right of the piston heads 210a and 212a are both vented to a sump as by the conduits 240, 242 so as to prevent the accumulation of hydraulic fluid therein by similar conduits opening into the right walls thereof.

When fluid pressure is admitted to the left side of the piston 210 the piston moves towards the right building up pressure in the cylinder aperture 216 which in turn causes piston 212 to move toward the right. The flange 212c of the piston 212 abuts against the left-hand end of the member 234 and pushes the drawbar assembly including the tubular member 198 and the bar member 194 to the right. This in turn moves the collet 192 and the ejector 208 to the right to release and unfreeze the tool arbor R from the spindle socket 184. Upon release of the pressure fluid in the conduit 230 the spring M returns the parts to their previous left positions. Pressure fluid is applied to the right side of the piston head 212a for the purpose of moving the flange 212c free or clear of the member 234, thus providing a small clearance between the abutting surfaces of these members when they are in their respective left-hand positions. The purpose of this clearance is to eliminate the wear which might otherwise occur therebetween since the drawbar assembly, including the member 234, rotate with the spindle while the piston 212 preferably remains stationary during the operation of the spindle.

Fluid pressure is supplied to the conduit 230 through a solenoid-operated valve supported in the rear end of the spindlehead in a suitable manner. The operation of the valve to control the flow of pressure fluid to the conduit 230 in the direction to release the spindle arbor is preferably controlled by a selector switch 240 located at a convenient position on the pendant control station P where it is readily accessible to the operator while he is holding the tool arbor in the spindle socket. Attention is called to the fact that in machines of the character shown, the rear or left-hand end of the spindle is not within the reach of an operator at the tool end of the spindle.

When the operator wishes to attach a tool to the spindle, he moves the selector switch 240 to eject position to cause pressure fluid to enter the rear or left end of the cylinder aperture 214. This moves the collet 192 outwardly or to the right as viewed in the drawings. He then inserts the tool arbor in the spindle socket and subsequently selects clamp position of the selector switch 240, whereupon the spring means M securely binds the tool arbor in the spindle socket and returns or moves the piston assembly to its former position. When the operator wishes to remove the tool, he merely reverses the operation.

The motor assembly must provide not only adequate force to overcome the spring means M which holds the spindle arbor in the socket and which, as previously stated, must be substantial, but sufficient force to unfreeze the spindle arbor from the socket, which force is also substantial because of the low angle of taper employed in the socket. As can be readily appreciated, the less the taper, the more securely will the tool arbor be held in the spindle socket. The present invention provides a construction wherein the necessary forces can be obtained with use of the usual shop compressed pressure fluid supply, while maintaining the overall diameter of the motor means to a minimum. This is of considerable practical advantage.

From the foregoing, it will be apparent that the object of the invention has been accomplished and that a new and improved machine tool has been provided having a spindle including a spring applied and power released locking or binding mechanism for releasably securing an arbor or tool in the spindle socket which is extremely reliable in operation and compact in construction. While the preferred embodiment of the invention has been described in considerable detail, it will be apparent that the invention is not limited to the construction shown and it is my intention to cover hereby all adaptations, modifications and changes therein which come within the practice of those skilled in the art to which the invention relates.

I claim:

1. In a machine tool, a movable spindlehead, a spindle member having an axially extending aperture terminating at one end in a tapered socket adapted to receive a tool device, means for rotatably connecting said spindle member to said spindlehead, a bar member supported within said axially extending aperture in said spindle member for limited reciprocating axially thereof, a collet member connected to the end of said bar member adjacent to said one end of said spindle member, means providing an inclined abutment surface on the interior of said spindle member adjacent to said collet, said collet member including a radially movable portion with a first inclined surface for engaging and holding a portion of a tool device inserted in said socket and received in said collet member and a second inclined surface for engaging and cooperating with said abutment surface on the interior of said spindle member, said abutment surface and said first and second inclined surfaces of said movable portion of said collet being inclined in the same general direction with respect to the axis of rotation of said spindle member and converging in the direction away from said socket, spring means for applying a first force on said bar member in the direction away from said socket, a reciprocating-type pressure fluid-actuated motor means for applying a second force to said bar member in the direction towards said socket to overcome the first force applied by said springs, said motor means comprising a first cylinder concentric with the axis of rotation of said spindle member, a first piston member having one side of less area than that of the other side in said first cylinder, a second cylinder arranged in tandem with respect to said first cylinder and concentric with the axis of rotation of said spindle member, a second piston member in said second cylinder, conduit means operatively connecting adjacent ends of said first and second cylinders, means for operatively connecting said second piston to said bar member, means for filling said conduit means between said first and second piston members with fluid, and means for selectively supplying pressure fluid to said first cylinder of said motor means.

2. In a machine tool, a movable spindlehead, a spindle member having an axially extending aperture terminating at the end in a tapered socket adapted to receive a tool device, means for rotatably connecting said spindle member to said spindlehead, a bar member supported within said axially extending aperture in said spindle member for limited reciprocating axially thereof, a collet member connected to the end of said bar member adjacent to said one end of said spindle member, means providing an inclined abutment surface on the interior of said spindle member adjacent to said collet, said collet member including a radially movable portion with a first inclined surface for engaging and holding a portion of a tool device inserted in said socket and received in said collet member and a second inclined surface for engaging and cooperating with said abutment surface on the interior of said spindle member, said abutment surface and said first and second inclined surfaces of said collet being inclined in the same general direction with respect to the axis of rotation of said spindle member and converging in the direction away from said socket, spring means for applying a first force on said bar member in the direction away from said socket, a reciprocating-type pressure fluid-actuated motor means for applying a second force to said bar member in the direction towards said socket, said motor means comprising a cylinder assembly provided with first and second cylinder apertures arranged in tandem and concentric with the axis or rotation of said spindle member and connected by a third aperture of lesser maximum diameter, a first piston member in said first cylinder aperture having an axial extension projecting into said third aperture, a second piston member in said second cylinder aperture, means for operatively connecting said second piston to said bar member, means for filling said third aperture between said first and second piston members with fluid, and means for selectively supplying pressure fluid to said first cylinder aperture of said motor means.

3. In a machine tool, a movable spindlehead, a spindle member having an axially extending aperture terminating at one end in a tapered socket adapted to receive a tool device, means for rotatably connecting said spindle member to said spindlehead, a bar member supported within said axially extending aperture in said spindle member for limited reciprocation axially thereof, a collet member connected to the end of said bar member adjacent to said one end of said spindle member, means providing an inclined abutment surface on the interior of said spindle member adjacent to said collet, said collet member including a radially movable portion with a first inclined surface for engaging and holding a portion of a tool device inserted in said socket and received in said collet member and a second inclined surface for engaging and cooperating with said abutment surface on the interior of said spindle member, said abutment surface and said first and second inclined surfaces of said movable portion of said collet being inclined in the same general direction with respect to the axis of rotation of said spindle member and converging in the direction away from said socket, spring means for applying a first force on said bar member in the direction away from said socket, a reciprocating-type pressure fluid-actuated motor means reciprocable with but not rotatable with said spindle member for applying a second force to said bar member in the direction towards said socket, said motor means comprising a first cylinder concentric with the axis of rotation of said spindle member, a first piston member having one side of less area than that of the other side in said first cylinder, a second cylinder arranged in tandem with respect to said first cylinder and concentric with the axis of rotation of said spindle member, a second piston member in said second cylinder, conduit means operatively connecting adjacent ends of said first and second cylinders, means for operatively connecting said second pistion to said bar member, means for filling said conduit means between said first and second piston members with fluid, and means for selectively supplying pressure fluid to said first cylinder of said motor means. and holding 4. In a machine tool, a movable spindlehead, a spindle member having an axially extending aperture terminating at one end in a tapered socket adapted to receive a tool device, means for rotatably connecting said spindle member to said spindlehead, a bar member supported within said axially extending aperture in said spindle member for limited reciprocation axially thereof, a collet member connected to the end of said bar member adjacent to said one end of said spindle member, means providing an inclined abutment surface on the interior of said spindle member adjacent to said collet, said collet member including a radially movable portion with a first inclined surface for engaging and holding a portion of a tool device inserted in said socket and received in said collet member and a second inclined surface for engaging and cooperating with said abutment surface on the interior of said spindle member, said abutment surface and said first and second inclined surfaces of said collet being inclined in the same general direction with respect to the axis of rotation of said spindle member and converging in the direction away from said socket, spring means for applying a first force on said bar member in the direction away from said socket, a reciprocating-type pressure fluid-actuated motor means reciprocable with but not rotatable with said spindle member for applying a second force to said bar member in the direction towards said socket, said motor means comprising a cylinder assembly provided with first and second cylinder apertures arranged in tandem and concentric with the axis of rotation of said spindle member and connected by a third aperture of lesser maximum diameter, a first piston member in said first cylinder aperture having an axial extension projecting into said third aperture, a second piston member in said second cylinder aperture, means for operatively connecting said second piston to said bar member, means for filling said third aperture between said first and second piston members with fluid, and means for selectively supplying pressure fluid to said first cylinder aperture of said motor means.

* * * * *